Oct. 17, 1967     C. F. WOLFENDALE     3,348,133
POSITION RESPONSIVE APPARATUS INCLUDING
A CAPACITIVE POTENTIOMETER
Original Filed Oct. 25, 1962     2 Sheets-Sheet 1
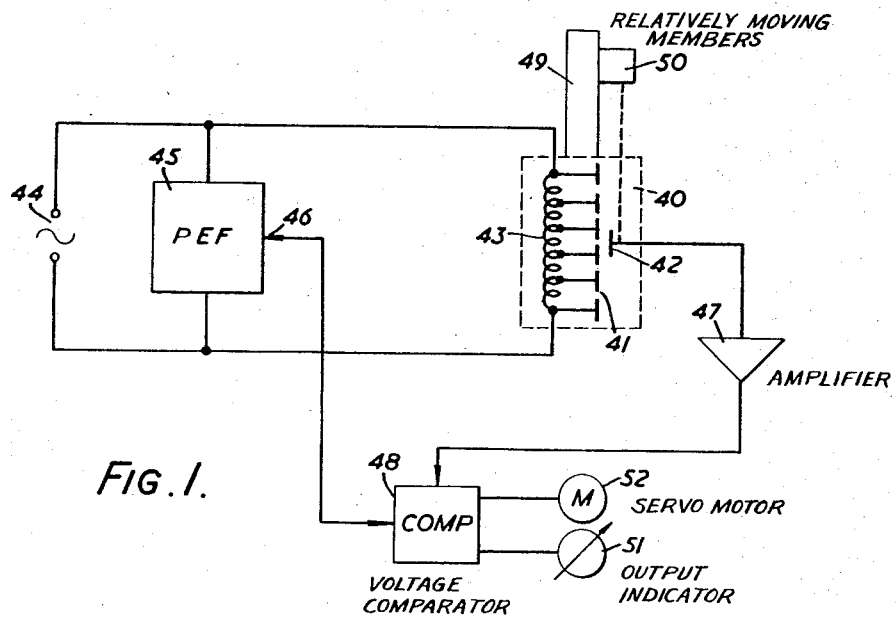
FIG. 1.
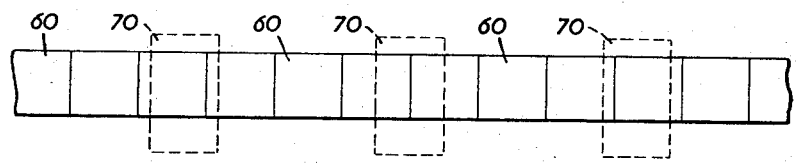
FIG. 19.
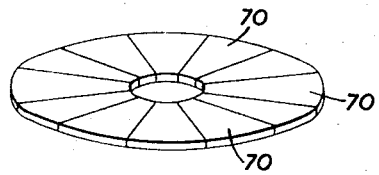
FIG. 20.
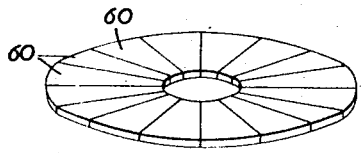
INVENTOR
CALEB FREDERICK WOLFENDALE
BY *Name and Nydick*
ATTORNEY Oct. 17, 1967

C. F. WOLFENDALE 3,348,133

POSITION RESPONSIVE APPARATUS INCLUDING
A CAPACITIVE POTENTIOMETER

Original Filed Oct. 25, 1962

INVENTOR
CALEB FREDERICK WOLFENDALE

BY Hame and Nydick

ATTORNEY

United States Patent Office 3,348,133
Patented Oct. 17, 1967

3,348,133
POSITION RESPONSIVE APPARATUS INCLUDING A CAPACITIVE POTENTIOMETER
Caleb Frederick Wolfendale, Great Brick Hill, near Bletchley, England, assignor to Sogenique (Electronics) Limited
Original application Oct. 25, 1962, Ser. No. 232,949. Divided and this application Oct. 18, 1965, Ser. No. 496,933
Claims priority, application Great Britain, Oct. 27, 1961, 38,527/61
4 Claims. (Cl. 323—93)

ABSTRACT OF THE DISCLOSURE

The capacitive potentiometer described exemplarily includes a row of stator electrodes and a movable pick-off electrode capacitively coupled to the stator electrodes. Successively greater alternating potentials are applied to the stator electrodes so that the potential of the pick-off electrode is a smooth function of its position. Irregularities are reduced or eliminated by shaping the pick-off electrode or the stator electrodes.

This invention relates to position-responsive apparatus and to capacitative potentiometers for use in such apparatus.

The present application is a divisional application based upon my prior application Ser. No. 232,949 filed Oct. 25, 1962 and now abandoned.

More particularly the invention relates to an apparatus in which the potentiometer comprises a series of elements arranged in line, the line being straight or curved as may be appropriate, elements of the series are energized from a suitable source of alternating potential so as to establish an electric field along the line of elements. A pick-off or interpolating electrode is arranged adjacent and movable relative to the elements of the series and in this way there is induced on the electrode a potential, with respect to a reference point, that is indicative of the relative position of the electrode and the elements. An apparatus of this kind is described in more detail in U.S. Patent 3,071,758 to P. C. F. Wolfendale.

An apparatus of this kind has exceptional properties. The inherent properties of the electrical system are such that the ultimate sensitivity is much higher than is required for all normal metrological requirements and is equal to or better than that of optical systems. In practice, with relatively simple constructions of the potentiometer a sensitivity of a few microinches or better can be readily attained.

The present invention is concerned with improvements in the construction of potentiometers for use in apparatus of this kind, the improvements being directed to arrangement by which the effects due to mechanical features or inevitable imperfections of the potentiometers are reduced or eliminated.

More particularly one imperfection which I have noted is a residual periodic variation which causes the response of the apparatus to depart slightly from a regular law. This irregularity is caused if an edge of the pick-off electrode passes over a similarly shaped edge of one of the elements arranged in line.

It is a more detailed object of the invention to reduce the amplitude of such irregularities.

In accordance with the present invention the edges of the pick-off electrode structure which extend transverse to the direction of relative movement, and of the transverse edges of the elements of the series are chosen to be different so that in effect the transition of an edge of the pick-off electrode structure over an edge of one of the elements in the line is made more gradual to reduce irregularities in the output characteristics.

Features and advantages of the invention will appear also from the following description of embodiments thereof, given by way of example, in conjunction with the accompanying drawings, in which:

FIGURE 1 is a simplified diagram showing the general arrangement of a position-response apparatus;

FIGURE 19 is a diagram showing a disposition of a series of elements and the interpolating electrodes, and FIGURE 20 is an exploded diagrammatic perspective view of an annular type series of elements and interpolating electrodes.

Figure 2:
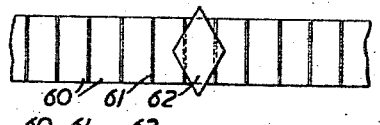
FIGURES 2 to 11 are diagrams showing arrangements of elements and electrodes in accordance with the invention.

FIGURE 1 is an example of a simple position responsive or control arrangement; this is an example only of a suitable arrangement and others are to be found in U.S. Patent 3,071,758. The apparatus shown in FIGURE 1 includes a capacitative potentiometer indicated generally by the broken line rectangle 40 and including a series of adjacent conductive elements 41, with insulating separators (not shown) between adjacent elements. As shown in FIGURE 1 the elements are arranged in a straight line, but this is not necessarily so, as will be apparent hereinafter.

Associated with the line of elements 41 is a pick-off or interpolating electrode system shown diagrammatically as an electrode 42; this electrode is spaced from and insulated from the elements 41; the electrode system 42 can be moved along or with respect to the line of elements 41, and in doing so will present a capacitance between it and the adjacent one or ones of the elements.

Different potentials are established along the series of elements 41, the means for this purpose consisting conveniently of a tapped inductive element 43, connected to an alternating current source 44. In this way successively increasing potentials are impressed upon the elements of the series, and hence, as the pick-off electrode moves along the elements of the series there will be induced on it a voltage indicative of its position relative to the elements.

The voltage thus induced can be related to the voltage at a reference point; for example a reference potential can be obtained from a reference voltage device 45 energized from source 44. In a very simple arrangement the reference point could be a tap on the inductive element 43, but as it will usually be desired to vary the voltage of the reference point finely and with precision, it is preferable to use other means affording a fine control of voltage. A tapped inductive element can be used or preferably a sequence of such elements, in the manner described in the copending application referred to, so as to enable the reference point to be selected with successive scales or decades of accuracy. The means for varying the reference point is indicated diagrammatically at 46, in FIGURE 1.

The alternating current potential produced on the pick-off electrode 42 is fed, through amplifier 47, to one input of a voltage comparator 48, to the other input of which is fed a voltage from the reference point 46.

Where the potentiometer is being used as part of an arrangement for indicating the position of a movable element, that movable element is coupled to the pick-off electrode 42 so as to cause the electrode to move along the line of elements 41.

For example, if the apparatus is being used in connection with a machine tool, the potentiometer might be connected to the bed of the machine, as indicated diagrammatically at 49 in FIGURE 1, the moving electrode 42 being coupled to or associated with the tool slide 50 so as to move with it.

The relative position of the two parts 49 and 50 can be indicated by an indicating instrument 51 which is connected to the output of comparator 48. This is a convenient method of indicating position, but is not highly accurate as it depends upon the constancy of output of source 44. A far greater accuracy is attainable by taking advantage of the fact that the circuit is a bridge circuit and, for any given position of electrode 42 adjusting the reference voltage unitl the bridge is balanced, as indicated by the null reading of meter 51.

Where the potentiometer forms part of an arrangement for controlling the position of the movable element, the arrangement is substantially similar to that just described, but with the difference that the deviation signal output from comparator 48 is used to control either directly or indirectly the operation of a reversible motor 52 which serves to drive the movable element 50 and therefore also the electrode 42 in a correcting sense. A null-seeking arrangement is used, so that when the deviation signal falls to zero the motor stops; the movable element will then be in the desired position.

In a practical construction the elements 41 might have the form of a series of short circular cylinders of metal, of equal length, secured end to end with a thin layer of insulating material between their adjacent ends. The interpolating electrode may then be a cylinder surrounding the line of elements; it will be understood that this is given as an example only of a suitable arrangement.

If with such a construction the interpolating electrode has the same length as one of the elements, it will be seen that the two edges of the electrode will pass at the same time over the transition points between adjacent elements. These transitions involve small non-linearities in the relationship between the voltage induced in the electrode and its relative position. It is very advantageous for this relationship to be linear, and so the reduction or elimination of the irregularities is desirable. The present invention enables such irregularities to be reduced.

One way of achieving the desired transitional effect as the edges of the electrode move over the edges of the adjacent elements is to have the elements defined by edges that are straight and parallel, and to modify the shape of the electrode so that its surface is not bounded by parallel edges or if bounded by parallel edges the edges are at a different inclination, considered in the direction of relative movement, from those of the elements.

Examples of constructions of this kind are shown in FIGURES 2 to 9. In these figures the elements 60 are shown as being of equal extent along the line of the elements, that is, in the direction of relative movement, and bounded by edges at right angles to that direction. It is convenient, but not necessary, that this should be so. Also, in practice the elements are usually stationary, because more connections to the elements are required; and the electrode moving. This arrangement will be assumed here, though other arrangements are possible.

In FIGURES 2 to 11, the elements are indicated at 60, with interposed insulation at 61. The elements can be flat, with their surfaces lying in a common plane, or cylindrical, with their outside surface again lying on a common, cylindrical surface. The moving electrode 62 will accordingly be plane or cylindrical.

Figure 3:
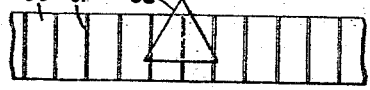
Figure 4:
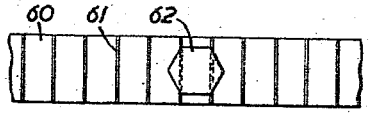
Figure 5:
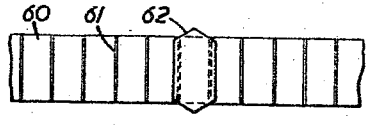
Figure 6:
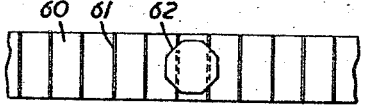
Figure 7:
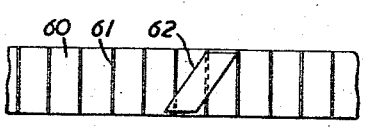
Figure 8:
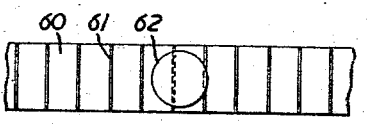
Figure 9:
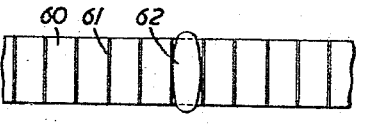

Electrode 62 is shown as having a variety of shapes. Thus FIGURE 2 shows a pick-off electrode 62 which is rhombus or diamond-shaped with its edges lying at an angle to the edges of elements 60 which are parallel and at right angles to the line of elements. In FIGURE 3 a triangular electrode is shown whilst in FIGURE 4 the electrode is a regular hexagon. With both these figures it will be seen that the moving electrode does not extend across the full width of the surface of the element. The pick-off electrode may take other polygonal or non-polygonal shapes. FIGURES 5 to 9 show various other useful shapes. In the arrangements of FIGURES 5 and 6, the pick-off electrode has respectively a hexagonal and a regular octagonal shape, the octagonal shape being a presently preferred arrangement. In FIGURE 7 the pick-off electrode take an elongate rhomboid shape, with its ends parallel to the direction of movement. The circular and oval shapes which the pick-off electrode takes respectively in FIGURES 8 and 9 are useful particularly where the output characteristics are non-linear.

Figure 10:
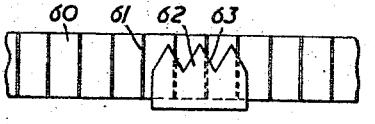
Figure 11:
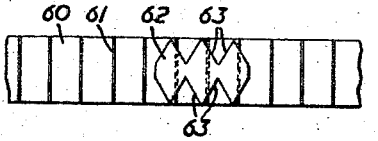

Another variation of electrode is shown in FIGURES 10 and 11. It will be appreciated that one of the factors which controls the manner in which the pick-off electrode interpolates between the voltages applied to successive electrodes is the extent of overlap in the linear direction, of the pick-off electrode and one of the elements. It may in some cases be advantageous for the pick-off electrode to extend the direction of relative movement, over more than one element, and a shape of electrode suitable for this purpose is shown in FIGURES 10 and 11. In FIGURE 10 the longitudinal edge of an electrode 62 is serrated at 63 and in FIGURE 11 both edges are serrated in this way.

The use of linear and non-linear edges for the elements and the electrode can be interchanged and FIGURES 12 to 16 of the drawings show arrangements of elements of the potentiometer which, in conjunction with a pick-off electrode having a rectilinear edge or edges, will produce a more gradual transition from one element to the next. The elements are shown as applied to a linear arrangement, but can be adapted to an arrangement, suitable for responding to angular movements, in which the elements are formed as segments of an annulus.

Figure 12:
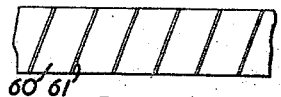
FIGURES 12 to 17 are diagrams showing possible arrangements of the elements.
Figure 13:
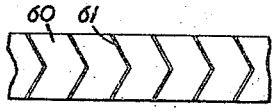
Figure 14:
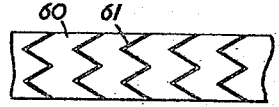
Figure 15:
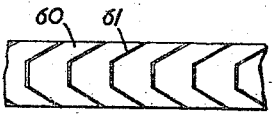
Figure 16:
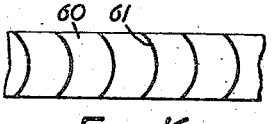
Figure 17:
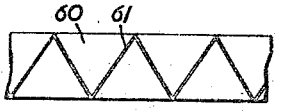

FIGURE 12 shows elements 60 the edges of which are parallel but inclined to the length of the line of elements, the elements being separated by insulation 61. In FIGURE 13 the edges of the elements 60 are defined by two straight portions arranged at an angle forming a chevron; in FIGURE 14 the arrangement is similar to that of FIGURE 13 but with the pattern repeated across the width of the elements, whilst in FIGURE 15 a combination of parts arranged both at right angles to the length of the elements and at an angle to them is provided. In FIGURE 16 the edges of the elements are curved. In FIGURE 17, the elements 60 are of triangular shape, insulated by spacers 61, the triangles being alternately transposed so that their apices lie at alternate edges of the line of elements. With the construction of FIGURE 17 the alternate triangles can have progressive voltages impressed upon them.

Figure 18:
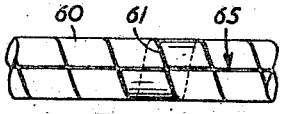
FIGURE 18 is a diagrammatic side view of another form of element arrangement.

A form of the element suited to a circular construction is shown in FIGURE 18, in which each element 60 takes the form of one turn of a helix; for clarity, one such element is shown shaded. The insulation 61 between elements includes a longitudinal part 65; with this arrangement it is preferred to use an electrode consisting of an incomplete annulus, or two segments of an incomplete annulus, with the gap between the parts of the electrode lying over the line of insulation 65.

In FIGURES 10 and 11, the electrode occupies a length of more than one element, and other forms of this arrangement is shown in FIGURES 19 and 20. The arrangement can be applied to both linear and angular type elements and involves the use of multiple electrodes so positioned that as the electrodes move, transitions over the edges of different electrodes over the elements do not occur simultaneously with all the electrodes. In FIGURE 19 a series of elements 60 co-operate with three electrodes 70 which move together, the electrodes being spaced by non-integral multiples of the lengths of the elements, so that the electrodes do not have the same relative position with respect to the adjacent element. In this way non linearities occurring due to imperfections at the transitions are averaged out. FIGURE 20 shows such an arrangement for angular response with a series of elements cooperating with multiple electrodes 70.

The various forms of potentiometer elements and electrodes described afford the facility of varying the characteristic of variation effected as the elements are moved relatively to the electrode. By such means it is possible to change considerably the way in which the desired potential is derived from the potentiometer, as the parts move relatively. In addition, as will be apparent from my copending application Ser. No. 140,874 filed September 1961 and issued as Patent 3,278,716 on Nov. 22, 1966. Further variation can be obtained by choice of the appropriate potentials applied to the linear elements of the potentiometer.

I claim:

1. In a position responsive apparatus for deriving an output alternating signal having an amplitude which is a function of the relative positions of two relatively movable members, a potentiometer including relatively movable first and second electrode means and guide means, said first electrode means including a line of at least three similar electrically separate electrically conductive plates presenting respective first electrode surfaces aligned in at least one dimension and in edge to edge relation, said second electrode means including a pick-off plate presenting a pick-off electrode surface spaced from said first electrode surfaces, and said guide means defining a path for movement of said pick-off electrode surface parallel to said first electrode surfaces, said surfaces having transverse edges which extend transverse to said path, at least one transverse edge of said pick-off electrode surface being disposed in such relation to said path as to pass over a transverse edge of said first electrode surfaces during movement along said path, said apparatus also including an alternating supply for establishing a reference potential, individual connection means for connection between said supply and respective plates of said line for establishing potentials on those plates which vary progressively along said line with respect to said reference potential, whereby to establish an electric field directed along said path of movement which induces a potential on said pick-off plate which is a function of its position with respect to said line of plates, mechanical coupling means for coupling said electrode means respectively to said members, and output means coupled to said pick-off plate for deriving said output signal, wherein the improvement comprises choosing the configuration of the transverse edges of said pick-off electrode surface to be dissimilar to the configuration of the transverse edges of each said first electrode surface whereby to reduce irregularities in the output characteristics of the apparatus.

2. Apparatus as claimed in claim 1 wherein said electrode plates are polygonal, said line of plates being a rectilinear line.

3. Apparatus as claimed in claim 2 wherein said pick-off plate has a different number of sides to said aligned plates.

4. Apparatus as claimed in claim 3 wherein said pick-off plate forms a regular octagon, and said first electrode plates are rectangular.

References Cited

UNITED STATES PATENTS

| | | | |
|---|---|---|---|
| 2,892,526 | 6/1959 | Devaud | 340—200 X |
| 2,978,638 | 4/1961 | Wing et al. | 317—249 X |
| 3,068,457 | 12/1962 | Nevius | 317—249 X |
| 3,142,795 | 7/1964 | Greeley | 323—93 |
| 3,146,394 | 8/1964 | Frisch | 323—93 |
| 3,222,591 | 12/1965 | Mynall | 323—74 X |
| 3,223,919 | 12/1965 | Langman | 323—43.5 |

JOHN F. COUCH, *Primary Examiner.*

A. D. PELLINEN, *Assistant Examiner.*